United States Patent
Korman

(10) Patent No.: US 10,845,238 B2
(45) Date of Patent: Nov. 24, 2020

(54) CIRCUIT AND DEVICE FOR SMALL PHOTO CURRENTS AND DETECTION OF SMALL PHOTO CURRENTS

(71) Applicant: K SCIENCES GP, LLC, San Antonio, TX (US)

(72) Inventor: Valentin Korman, Huntsville, AL (US)

(73) Assignee: K Sciences GP, LLC, San Antonio, TX (US)

( * ) Notice: Subject to any disclaimer, the term of this patent is extended or adjusted under 35 U.S.C. 154(b) by 100 days.

(21) Appl. No.: 16/045,450

(22) Filed: Jul. 25, 2018

(65) Prior Publication Data

US 2018/0328784 A1  Nov. 15, 2018

Related U.S. Application Data

(63) Continuation of application No. 15/335,227, filed on Oct. 26, 2016, now Pat. No. 10,048,125.

(60) Provisional application No. 62/247,455, filed on Oct. 28, 2015.

(51) Int. Cl.
*G01J 1/44* (2006.01)
*G01J 5/24* (2006.01)
*G01J 1/16* (2006.01)

(52) U.S. Cl.
CPC . *G01J 1/44* (2013.01); *G01J 5/24* (2013.01); *G01J 2001/1631* (2013.01); *G01J 2001/446* (2013.01)

(58) Field of Classification Search
CPC ........... G01J 1/44; G01J 5/24; G01J 2001/446
USPC ........................................................ 250/210
See application file for complete search history.

(56) References Cited

U.S. PATENT DOCUMENTS

| | | | | |
|---|---|---|---|---|
| 4,490,037 A | * | 12/1984 | Anagnostopoulos .. | H04N 5/374 348/E3.029 |
| 4,531,414 A | * | 7/1985 | Kraus ...................... | G01D 5/26 250/231.1 |
| 4,700,380 A | * | 10/1987 | Ahuja .................. | H03K 17/305 379/177 |
| 4,902,884 A | | 2/1990 | Szabo et al. | |
| 5,497,772 A | | 3/1996 | Schulman et al. | |
| 7,964,806 B2 | * | 6/2011 | Freydank ............... | G01G 23/10 177/185 |
| 8,912,725 B2 | | 12/2014 | Ye | |
| 2006/0079762 A1 | | 4/2006 | Norris et al. | |

(Continued)

FOREIGN PATENT DOCUMENTS

| | | |
|---|---|---|
| EP | 0 306 10 A1 | 6/1981 |
| WO | WO-2015/169955 | 11/2015 |

OTHER PUBLICATIONS

International Search Report and Written Opinion for International Patent Application No. PCT/US2019/064005 dated Mar. 2, 2020.

(Continued)

*Primary Examiner* — Seung C Sohn
(74) *Attorney, Agent, or Firm* — Foley & Lardner LLP

(57) ABSTRACT

A bridge circuit arrangement, method of providing said bridge circuit arrangement, and uses thereof are described. The bridge circuit arrangement comprises a first photodevice configured on a first arm, a second photodevice configured on a second arm, a first resistor configured on a third arm, and a second resistor configured on a fourth arm of the bridge. The first and second photodevice provide current flow.

16 Claims, 3 Drawing Sheets

(56) References Cited

U.S. PATENT DOCUMENTS

| | | |
|---|---|---|
| 2007/0177162 A1* | 8/2007 | Glueck .............. F16C 19/522 |
| | | 356/621 |
| 2011/0105868 A1 | 5/2011 | Westphal |
| 2016/0022178 A1 | 1/2016 | Wang |
| 2016/0209396 A1 | 7/2016 | Bordelon et al. |
| 2017/0172480 A1 | 6/2017 | Braig et al. |

OTHER PUBLICATIONS

Anonymous: "Op Amp Input Offset Voltage," Analog Devices Mt-037 Tutorial, Jan. 1, 2009; URL:http://www.analog.com/media/en/ training-seminars/tutorials/MT-037.pdf.

Extended European Search Report for EP 20176619.3 dated Aug. 24, 2020, received Sep. 10, 2020.

Non-Final Office Action on U.S. Appl. No. 15/363,983 dated Oct. 6, 2020.

* cited by examiner

CIRCUIT AND DEVICE FOR SMALL PHOTO CURRENTS AND DETECTION OF SMALL PHOTO CURRENTS

CROSS-REFERENCE TO RELATED APPLICATIONS

This application claims the benefit of, priority to, and is a continuation of U.S. patent application Ser. No. 15/335,227 filed Oct. 26, 2016, and entitled "Circuit and Device for Small Photo Currents and Detection of Small Photo Currents" which claims the benefit of and priority to U.S. Provisional Patent Application No. 62/247,455, filed on Oct. 28, 2015, and entitled "Circuit and Device for Small Photo Currents and Detection of Small Photo Currents," both of which are incorporated herein by reference in their entirety.

STATEMENT REGARDING FEDERALLY-SPONSORED RESEARCH OR DEVELOPMENT

Not applicable.

BACKGROUND

The present invention relates to a circuit arrangement and a device utilizing said circuit arrangement, and more particularly a differential circuit arrangement. The circuit arrangement described herein is, in one or more embodiments, utilized with small photo currents and for detection of small photo currents.

The discussion of the background provided herein is included to provide context. This is not to be taken as an admission that any of the information was published, or was prior art.

A Wheatstone bridge circuit is well suited for measuring small changes in resistance. The Wheatstone bridge circuit arrangement, as shown in FIG. 1, includes three known resistances (two are constant, $R_1$ and $R_2$ and one is variable, $R_3$), an unknown variable resistor (Rx) and a voltage source. This circuit configuration is designed to provide output from a single current or voltage source. The unknown variable resistance, Rx, is found by an equation, in which $Rx = (R_2 \cdot R_3)/R_1$ ($R_1$ and $R_2$ together providing one half of the bridge, and $R_3$ and Rx together providing another half of the bridge). After balancing the two arms of the bridge (in which $V_{out}=0$ between two arms of the bridge), a small change in resistance of Rx causes a voltage output. In this way, small resistance changes in the unknown variable resistor can be measured. However, when applied with certain sensing devices, such as photodiodes, the photodiodes are arranged so that current generated by the photodiodes are in the same direction on each arm, meaning the diodes are arranged so as to face the same direction. Furthermore, because photodiodes produce only very small current flow even when fully lit, when photodiodes are in such an arrangement, the circuit will generally require additional input (active elements). This is often accomplished by at least adding an operational amplifier and/or a power source. The operational amplifier is typically arranged to provide feedback and/or to obtain an output voltage. For example, in typical configurations, at least one operational amplifier and often more than one operational amplifier are included, these configurations often having one operational amplifier associated with each photodiode. The operational amplifier will generally include two input terminals to operate the photodiode without bias. A capacitor is often included to prevent oscillation or gain peaking and to set output bandwidth. These add-on or active elements add to complexity of the circuit.

It is also difficult to obtain linear output from a photodiode in a Wheatstone bridge configuration. While, the addition of the external operational amplifiers to the circuit assist in obtaining linear output, such a circuit still requires even further external components to provide a linearizing circuit. For example, a bipolar power supply can be included. Alternatively, a unipolar power supply is added. Again, the additional external (active) sources add to complexity of the circuit.

The typical photodiode circuit arrangements described above not only have added complexity, the additional or external (active) elements add bulk. Further, it is found that with any of the above-described complex circuit arrangement, self-heating and/or overheating will likely occur, which can affect measurement accuracy.

In view of the above issues and problems, there remains a need to overcome said issues and problems as well as others associated with such circuit arrangements. There remains a need for improved circuit arrangements, ones for detecting and measuring small photo currents and for use with photocurrent devices.

SUMMARY

The invention described herein overcomes one or more problems described above.

Described herein is a bridge circuit arrangement comprising a first photodevice configured on a first arm of the bridge. The bridge circuit arrangement comprises a second photodevice configured on a second arm of the bridge. The bridge circuit arrangement comprises a first resistor configured on a third arm of the bridge, the first resistor being a variable resistor. The bridge circuit arrangement comprises a second resistor configured on a fourth arm of the bridge, the second resistor being a constant resistor. The first and second photodevices provide current flow in opposing directions. The bridge circuit arrangement need not be externally powered. The first photodevice on the first arm includes a third resistor having an equivalent resistance to the first photodevice. The second photodevice on the second arm includes a fourth resistor having an equivalent resistance to the second photodevice. The first photodevice is grounded. The second photodevice is grounded. The first photodevice may be a photodiode. The second photodevice may be a photodiode. The second resistor has a fixed value. The second resistor may have a resistance coefficient of or about 1 KΩ. The bridge circuit arrangement does not include on operational amplifier within the bridge circuit arrangement providing an output current. In one or more embodiments, output current of the bridge circuit arrangement may be null. In some embodiments, output current of the bridge circuit arrangement is provided by a difference in current between the first photodevice and the second photodevice. The bridge circuit arrangement does not require a voltage source. The bridge circuit arrangement may be provided with a plurality of same or similarly configured bridge circuit arrangements provided in an array. The bridge circuit arrangement may be provided with a plurality of same or similarly configured bridge circuit arrangements provided in series. The bridge circuit arrangement may be provided with a plurality of same or similarly configured bridge circuit arrangements provided in parallel. The bridge circuit arrangement may be coupled externally to an ammeter. The bridge circuit arrangement may be coupled externally to a current mirror circuit. The bridge circuit arrangement may be coupled externally to one or more transimpedence amplifiers. In one or more embodiments, the bridge circuit arrangement is balanced by illuminating the first and second photodiode and adjusting the arrangement so the net current is zero.

Additionally described is a further bridge circuit arrangement. The bridge circuit arrangement includes a first photodevice configured on a first arm of the bridge circuit arrangement, a second photodevice configured on a second arm of the bridge circuit arrangement, a first resistor configured on a third arm of the bridge circuit arrangement, the first resistor being a variable resistor, and a second resistor configured on a fourth arm of the bridge circuit arrangement, the second resistor being a constant resistor. In various embodiments, the first and second photodevices each provide a current in response to illumination, wherein the flow in opposing directions. In various embodiments, the first resistor has a coefficient of resistance corresponding to wherein there is no net current flowing between the first photo device and the second photodevice.

Also described herein is a method of configuring a bridge circuit arrangement. The method comprises providing a first photodevice on a first arm of the bridge circuit arrangement. The method comprises providing a second photodevice on a second arm of the bridge circuit arrangement. The method comprises providing a first resistor on a third arm of the bridge circuit arrangement, the first resistor being a variable resistor. The method comprises providing a second resistor on a fourth arm of the bridge circuit arrangement, the second resistor being a constant resistor. The method comprises directing the first and second photodevice in order to provide current flow in opposing directions. The method comprises configuring the first photodevice on the first arm with a third resistor having an equivalent resistance to the first photodevice. The method comprises configuring the second photodevice on the first arm with a fourth resistor having an equivalent resistance to the first photodevice. The method comprises providing no external power to the bridge circuit arrangement. The method may further comprise illuminating the first and second photodiode and balancing the bridge circuit arrangement such that a net current in the bridge circuit arrangement is zero.

These and additional embodiments are further disclosed in the description that follows.

BRIEF DESCRIPTION OF THE DRAWINGS

For a more complete understanding of various embodiments of the present disclosure and the advantages thereof, reference is now made to the following brief description, taken in connection with the accompanying drawings, appendices, and detailed description, wherein like reference numerals represent like parts, and in which.

DESCRIPTION OF THE VARIOUS REPRESENTATIVE EMBODIMENTS

Figure 1:
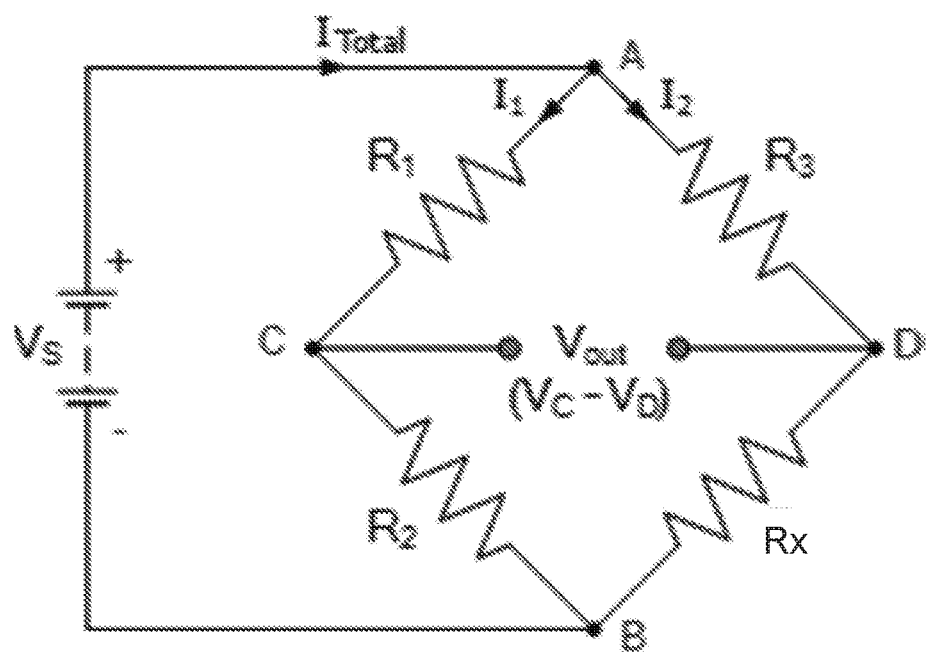
FIG. 1 is a diagram of a prior art Wheatstone bridge circuit.
Figure 2:
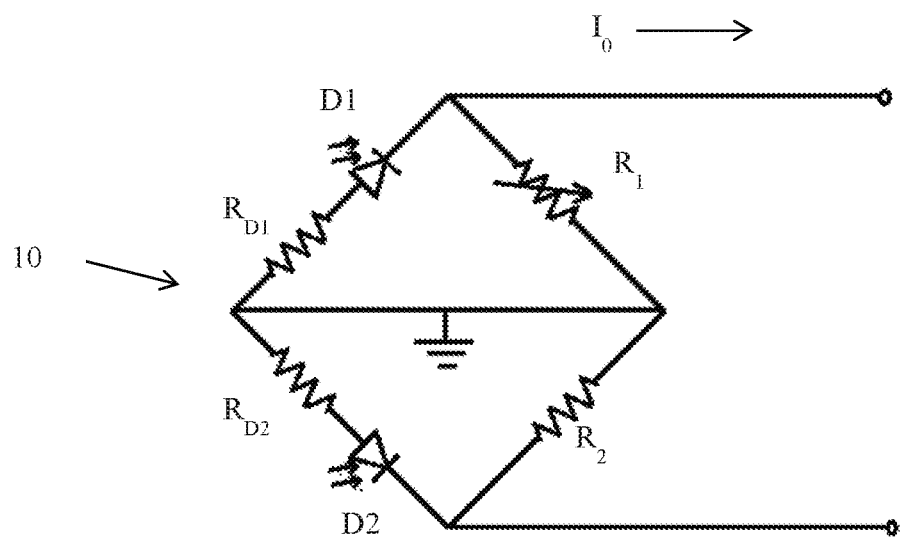
FIG. 2 is a diagram of a representative circuit arrangement described herein.
Figure 3:
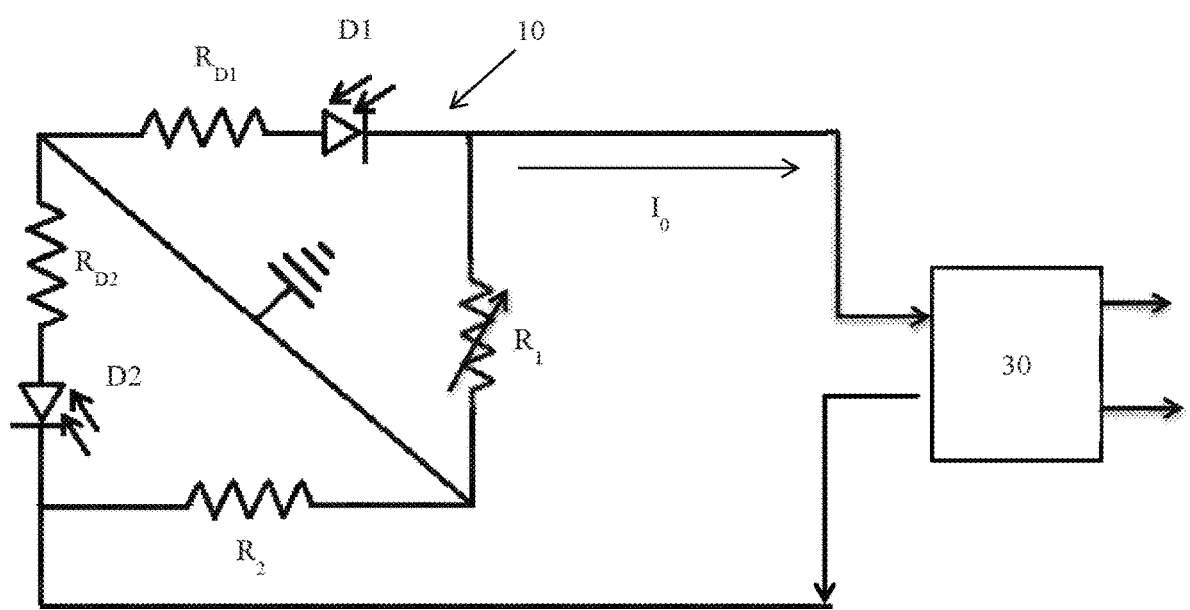
FIG. 3 is a diagram of another representative circuit arrangement described herein.

Referring to FIGS. 2 and 3, two photodevices D1 and D2 are connected in a bridge circuit configuration 10, having four arms as depicted by the bridge. Photodevices D1 and D2 do not themselves share a common terminal.

Between the photodevices D1 and D2 are, respectively, resistors $R_{D1}$ and $R_{D2}$. Resistors $R_{D1}$ and $R_{D2}$ have an equivalent resistance of the photodevices D1 and D2, respectively. Unlike the photodiode Wheatstone bridge configuration described above, current (I) from each photodevice D1 and D2 flows in different (opposing) directions. As depicted in FIGS. 2 and 3, photodevice D1 with resistors $R_{D1}$ is grounded. Similarly, photodevice D2 with resistor $R_{D2}$ is grounded.

The photodevices D1 and/or D2 may be diodes, e.g., photodiodes. The photodevices D1 and/or D2 may comprise, for example, silicon or germanium, as examples, or may be another type of photodevice. The photodevices D1 and D2 may comprise photodetectors, including but not limited to a photovoltaic cell, phototube, phototransistor, optical detector, photoresistor, as additional yet nonlimiting examples. Generally, in one or more embodiments, photodevice D1 is the same type as photodevice D2. Both photodevice D1 and photodevice D2 are functional photodevices. Both photodevice D1 and photodevice D2 may receive input as direct photonic input, such as from light or a light source. No additional light source is required in the arrangement depicted in FIGS. 2 and 3. In addition, no additional energy or input source is required in the arrangement depicted in FIGS. 2 and 3. The photonic input or light may, for example, be sunlight. Other light sources are acceptable, said light sources will depend on the photodevice and the light receiving element(s) that are in the photodevice. Further, in bridge circuit configuration 10, as depicted in FIGS. 2 and 3, no additional energy source or input is required, with the exception of input or energy, such as light, directed onto and/or received by photonic device D1 and/or photonic device D2.

The bridge circuit configuration 10 further comprises resistor R1, which is a variable resistor, and resistor R2, which is a constant resistor. The resistor R2 has a fixed value. The fixed value may be a resistance coefficient of at or about 1 KΩ. In one or more embodiments, neither R1 nor R2 are higher value resistors (of up to 1 MΩ), since applying higher value resistors directly to a balanced circuit may cause loading.

As illustrated, the bridge circuit configuration 10 of FIGS. 2 and 3 is passive and is not externally powered. For example, neither photodevice D1 nor photodevice D2 is coupled to an additional external source. The bridge circuit configuration 10 does not require an external power source. There is no voltage source (voltage supply) other that the photodevices D1 and D2. The bridge circuit configuration 10 described herein does not require an active operational amplifier as part of the bridge arrangement, such as for driving the circuit. The bridge circuit configuration 10 described herein does not, as depicted in FIGS. 2 and 3, require or provide feedback, such as for activation.

Energy or current in the circuit arrangement of bridge circuit configuration 10, such as depicted in FIGS. 2 and 3, is provided by light only. The light is light external to the bridge circuit configuration 10 described herein. The light may be any wave length. It should be understood then that in the described circuit arrangement of the bridge circuit configuration 10, function of the circuit is driven by the external light only, which is when light is emitted on photodevices D1 and D2. Current generation is a function of only the emitted light (external light on photodevices D1 and D2) and output is a function of a difference in the signal (current generated) between photodevice D1 and photodevice D2.

In operation, the bridge circuit configuration 10 is initially balanced by illuminating photodevice D1 and photodevice D2 by a same amount. The variable resistor R1 is set until there is no net current ($I_0$) flowing between photodevice D1 and photodevice D2. Thus, the bridge circuit configuration 10 is initially equalized, and $I_1$ (of photodevice D1) will equal $I_2$ (of photodevice D2). When balanced, there is no net current flow in the bridge circuit configuration 10 of FIGS. 2 and 3. In one or more embodiments, one type of light is provided to the bridge circuit configuration 10. While the same type of light is provided to photodevice D1 and photodevice D2, the same type of light may be from the same source (S) or may be from a separate source (S1 and S2), in which, when from a separate source, one source (S1) is for illumination of photodevice D1 and one source (S2) is for illumination of photodevice D1. As long as photodevice D1 and photodevice D2 are balanced, it isn't essential that illumination of photodevice D1 and photodevice D2 be equivalent (S1 input energy does not have to equal S2 input energy), as long as the net flow of current is zero when balanced.

As represented in FIG. 3, an external component 30 is coupled to the bridge circuit configuration 10 for monitoring or measuring output. In one or more embodiments, external component 30 may comprise an ammeter for monitoring $I_0$ between photodevice D1 and photodevice D2.

In one or more embodiments, external component 30 may comprise a current mirror circuit to which $I_0$ is fed. The current mirror circuit replicates the bridge circuit without loading.

In one or more embodiments, external component 30 may additionally comprise higher resistors. Similarly, in some embodiments, external component 30 may additionally comprise transimpedence amplifiers. Either or both higher resistors and transimpedence amplifiers are coupled to the current mirror circuit to which $I_0$ was fed. The higher resistors and/or transimpedence amplifiers convert current from the current mirror circuit to a voltage signal. Similar modules and/or data acquisition systems are equally acceptable, such as those found via sources, such as Arduino and Raspberry Pi.

Once balanced, current flow of the bridge circuit configuration 10 is provided when there is a small difference in illumination (input energy) between photodevice D1 and photodevice D2. This difference in illumination corresponds with a difference in current flow of photodevice D1 as compared with photodevice D2. Thus, measurement of current as described herein is found when there is a difference between $I_1$ (photodevice D1) and $I_2$ (photodevice D2). The difference may be $I_1-I_2$ or may be $I_2-I_1$.

When input energy is from a single light source (S), the difference in current between photodevice D1 and photodevice D2 may arise when one photodevice (e.g., D1) is blocked (or filtered) or partially blocked (or partially filtered), such that input energy to D2 remains the same while input energy to photodevice D1 is reduced. This difference between current flow from photodevice D1 and current flow from photodevice D2 creates a change in the net current flow from null (here, the change is reflected as: $I_2-I_1$).

When input energy is from two different light sources (S1 and S2), the difference in current between photodevice D1 and photodevice D2 may arise when only one source is blocked (or filtered) or the one source is partially blocked (or partially filtered). The difference in current between photodevice D1 and photodevice D2 may also arise when only one of photodevice D1 or photodevice D2 is blocked (or filtered) or is partially blocked (or partially filtered). The difference in current between photodevice D1 and photodevice D2 may also arise when input energy via either of S1 or S2 is increased. The latter can only occur when the initial balance of bridge circuit configuration 10 occurred at a submaximal amount (submaximal illumination).

Unlike alternative devices, in which the amount of illumination matters and the total (net) amount of illumination is measured, with the bridge configuration 10 described herein, the amount of illumination (light) or total (net) amount of illumination (light) is not measured. Instead, it is only the difference in illumination between photodevice D1 and photodevice D2, reflected as a change in current flow, thereby providing a subtraction circuit.

Net current flow, when measured after the bridge configuration 10 is balanced, may be in nA or may be up to several uA or more. This is contrasted with many alternative bridge circuit configurations, such as described above, in which net current flow in the above described Wheatstone bridge arrangement, one comprising more than one photodevice, is a sum of the current output from all the photodevices after subtracting from the ground signal (which may or may not be zero).

The described bridge circuit configuration 10 may be included in any programmable or nonprogrammable integrated circuit chip.

The described bridge circuit configuration 10 may be provided in series or in parallel in a system comprising a plurality of the bridge circuit configurations 10.

The described bridge circuit configuration 10 may be provided in an array comprising a plurality of the bridge circuit configurations 10.

The described bridge circuit configuration 10 when provided with a sensing device can, for example, provide color definition without worrying about light level.

The described bridge circuit configuration 10 may be applicable to photolithography and/or image positioning.

The described bridge circuit configuration 10 may be applicable for positioning of any element, thus, is responsive to the presence or absence of the element, which may be positioned in, partially in, partially out, and out of the field of illumination. These and other examples are contemplated with the bridge circuit configuration 10 described herein.

The present disclosure includes preferred or illustrative embodiments in which specific sensors and methods are described. Alternative embodiments of such sensors can be used in carrying out the invention as claimed and such alternative embodiments are limited only by the claims themselves. Other aspects and advantages of the present invention may be obtained from a study of this disclosure and the drawings, along with the appended claims.

What is claimed is:

1. A bridge circuit arrangement comprising:
   a first photodevice configured on a first arm of the bridge circuit arrangement, the first arm defined between a first and second circuit node;
   a second photodevice configured on a second arm of the bridge circuit arrangement, the second arm defined between the second circuit node and a third circuit node;
   a first resistor configured on a third arm of the bridge circuit arrangement, the third arm defined between the first circuit node and a fourth circuit node; and
   a second resistor configured on a fourth arm of the bridge circuit arrangement, the fourth arm defined between the third and the fourth circuit node.

2. The bridge circuit arrangement of claim 1, the first resistor being a variable resistor.

3. The bridge circuit arrangement of claim 2, the second resistor being a constant resistor.

4. The bridge circuit arrangement of claim 1, the first and second photodevices providing current flow in opposing directions.

5. The bridge circuit arrangement of claim 1, wherein the bridge circuit arrangement is not externally powered.

6. The bridge circuit arrangement of claim 1, wherein output current of the bridge circuit arrangement is null.

7. The bridge circuit arrangement of claim 1, wherein output current of the bridge circuit arrangement is provided by a different in current between the first photodevice and the second photodevice.

8. The method of claim 1, wherein the second and the fourth nodes are connected and share a same electrical potential.

9. The method of claim 1, wherein the second and the fourth nodes are both grounded.

10. A method of configuring a bridge circuit arrangement, the method comprising:
   providing a first photodevice on a first arm of the bridge circuit arrangement, the first arm defined between a first and second circuit node;
   providing a second photodevice on a second arm of the bridge circuit arrangement, the second arm defined between the second circuit node and a third circuit node;
   providing a first resistor on a third arm of the bridge circuit arrangement, the third arm defined between the first circuit node and a fourth circuit node; and
   providing a second resistor on a fourth arm of the bridge circuit arrangement, the fourth arm defined between the third and the fourth circuit node.

11. The method of claim 10, the first resistor being a variable resistor.

12. The method of claim 11, further comprising illuminating the first and second photodiode and balancing the bridge circuit arrangement by setting a resistance of the variable resistor such that a net current in the bridge circuit arrangement is zero.

13. The method of claim 10, the second resistor being a constant resistor.

14. The method of claim 10, balancing the bridge circuit arrangement by setting a resistance of the variable resistor such that a net current in the bridge circuit arrangement is zero.

15. The method of claim 10, further comprising directing the first and second photodevice in order to provide opposing currents.

16. The method of claim 10, further comprising providing no external power to the bridge circuit arrangement.

* * * * *